Jan. 29, 1935. M. A. SISK 1,989,217
TIRE CHAIN
Filed Aug. 13, 1932 2 Sheets-Sheet 1
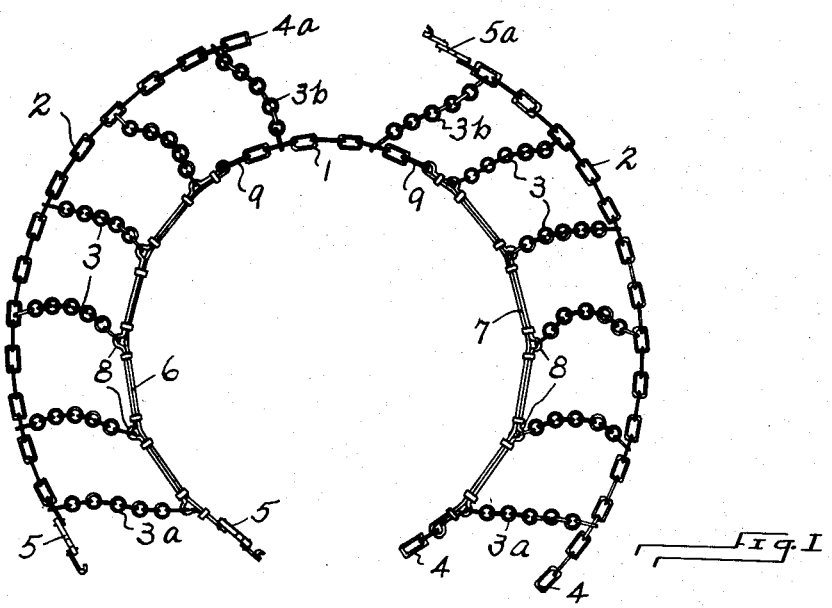
Fig. I
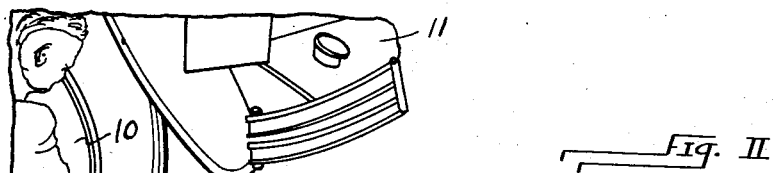
Fig. II
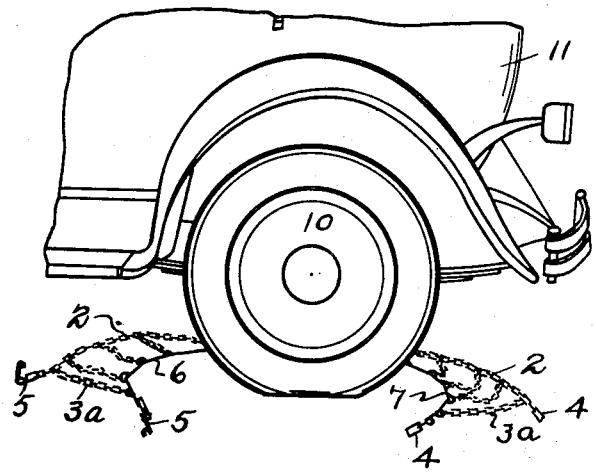
Fig. III
INVENTOR
Martin A. Sisk
by Christy Christy and Wharton
his attorneys

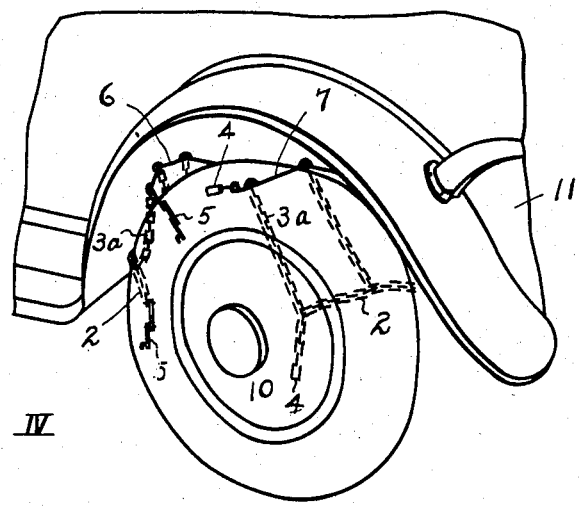
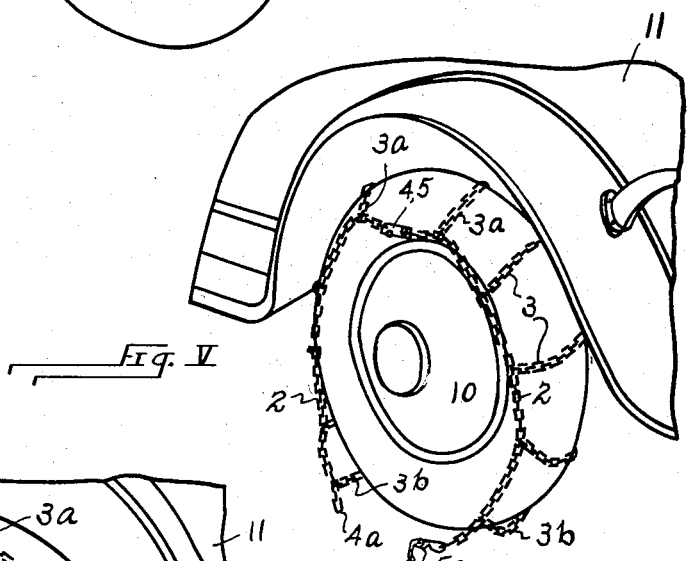
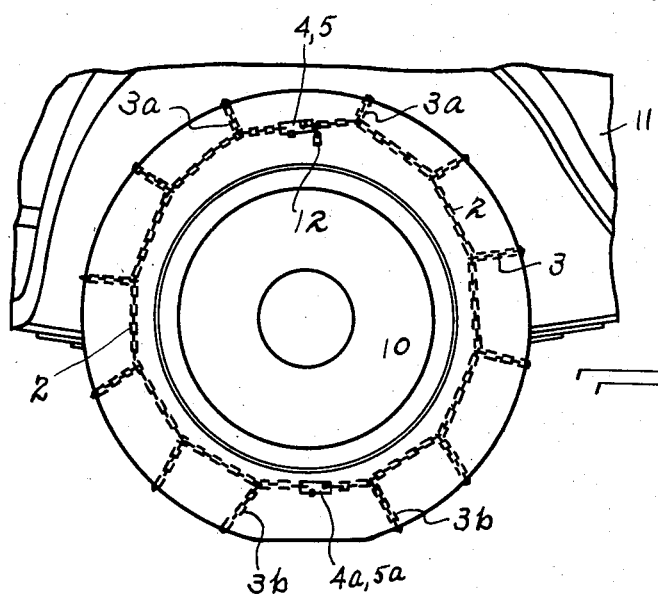

Patented Jan. 29, 1935

1,989,217

UNITED STATES PATENT OFFICE 1,989,217

TIRE CHAIN

Martin A. Sisk, Pittsburgh, Pa.

Application August 13, 1932, Serial No. 628,649

2 Claims. (Cl. 152—14)

My invention relates to a tire chain, an anti-skid device for application to the tire of a vehicle. The invention embraces certain improvements in tire-chain construction, and also concerns an improved method of installing the chain upon a tire.

The object of the invention is to provide a tire chain such in structure that it may be readily applied to the tire of a vehicle at rest upon the ground or other supporting surface. I intend that the chain may be installed upon a tire without jacking up the car, or without otherwise moving the car, and without the need of tools.

A still further object is to provide a method which permits an attendant to install the tire chain while standing or crouching in a position at the side of the vehicle. That is, in the practice of my invention the attendant need not reach under the tire, neither is it necessary for him to reach over or behind the tire, to effect the installation of my anti-skid chain.

Figure I of the accompanying drawings shows in plan a tire chain embodying the invention; and Figures II to VI are fragmentary views showing an automobile wheel, and illustrating successive steps in applying the chain structure to the tire of the wheel.

My tire chain comprises two side strands 1 and 2, which are interconnected at intervals by cross-strands 3. In service the side strands 1, 2 lie against the opposite sides of the tire, and secure the cross-strands 3 to the traction face or tread of the tire. Except as hereinafter specified, the side strands 1, 2 and cross-strands 3 may be constructed of chain links in accordance with known practice; and particular shape and composition of the chain links are matters for the engineer and metallurgist.

Both side strands 1, 2 are parted between one and the same pair of cross strands 3a, and the free ends of the parted side strands are provided with fastener elements. That is to say, end links 4 constitute fastener elements that co-operate with hook fastener elements 5 on the opposite parted ends of the side strands. It is characteristic of my tire chain structure that the side strand 2 is parted at a second point, the fastener elements 4a and 5a being secured to the respective ends provided in such side strand between the pair of cross-strands 3b. The fasteners (4, 5) may comprise any one of the fastening devices or turnbuckles commonly employed in tire chains to-day, and the specific structure of the fasteners (4, 5) is of concern only to the extent that they are adapted to break and to complete the continuity of the side strands 1, 2. While I have remarked that the side strand 2 is separable at a second point, and while such second parting of the side strand is essential, it is to be noted that an important and distinguishing feature of my structure lies in the location of such second point (cf. 4a, 5a) of parting in side strand 2 with respect to the first-mentioned parting (cf. 4, 5). That is, in the circular extent of the chain structure the two points of separation in chain 2 lie diametrically opposite, or substantially so. Expressed in other words, the two partings are so relatively located in the structure as to divide the side strand 2 into two substantially equal lengths. The importance of this particular construction will be readily understood when the following description of the chain-installing process is considered.

The side strand 1 includes two elongate, curved members 6 and 7, which are relatively stiff or rigid in comparison with the extreme flexibility of the chain-link portion of the side strand. Advantageously, the stiff members 6, 7 are fashioned of twin or companion reaches of metal wire or rod; at intervals in the members 6, 7 eyelets 8 are provided for the permanent or detachable securing of the cross-strands 3, and at their opposite ends the members 6, 7 include appropriate eyelets or other suitable structure to receive the chain links 9 and fastener elements 4, 5.

The improved and simplified method of installing an anti-skid chain to the tire of a vehicle—a method made possible by the particular structure described—is as follows:

The three fasteners (cf. 4, 5—4, 5—4a, 5a) are opened and the tire chain structure is spread upon the surface supporting the vehicle. Tire chains ordinarily are applied to the rear traction wheels of the vehicle, and to equip such rear wheels with tire chains, I spread one of my chains to the rear of each wheel, as indicated in Fig. II. However, it will be understood that, if anti-skid means are desired on the front wheels of the vehicle, my chains will be spread on the supporting surface forwardly of each front wheel. In following through the steps involved in applying my tire chain to the left rear wheel 10 of an automobile 11, the application with respect to the other wheels of the vehicle will be apprehended.

From a position at the outer side of the wheel 10, the attendant grasps the stiff member 6, as indicated in Fig. II, and thrusts it around the back of the tire, that is, the chain is thrust from the rear end of the tire toward the front end thereof. The length and the curved shape of member 6 are such that its outer end (the end carrying one of the fastener elements 5) is presented at front end of the tire, where said outer end is readily accessible to the grasp of the attendant. Thus, while remaining in substantially a stationary position at the outer side of wheel 10, the attendant grasps the outer end of the stiff member 6, which has been so presented at the front end of the tire, and draws or brings the chain structure to the position shown in Fig. III, in which position the stiff members 6 and 7 lie at opposite ends of the wheel, and the fastener 4a, 5a lies directly behind the wheel.

It will be apparent in the drawings that the general curved shape, the length, and the rigidity of the stiff members 6, 7 facilitate the handling of the chain in the manner above described. From time to time the stiff member 7, instead of member 6, may be the one which is thrust behind the wheel. Such alternative in the operation brings the opposite surfaces of the cross-strands 3 into engagement with the road, and tends to distribute the wear uniformly over the chain links. Of course, the operation described thus far may be reversed in the sense that one or the other of the stiff members 6, 7 may be passed from front to rear behind the wheel 10, instead of being passed from the rear to the front, as indicated in Fig. II. In either case, my chain structure is brought substantially to the position shown in Fig. III.

Next the attendant grasps the outer ends of the stiff members 6 and 7, one end in each hand, and lifts the chain structure to the position shown in Fig. IV. In such position the side strand 1 (the strand including the stiff members) loops beneath the axle of the vehicle, and the outer ends of the stiff members, including their associated fastener elements 4 and 5, extend outwardly of the outer side face of the tire. The fastener elements 4, 5 on the stiff members 6, 7 are then united, completing the continuity of the side strand 1. The ease with which the continuity of the inner side strand 1 is completed is an advantage requiring no explanation to those skilled in the art. I may add that, while the fastener elements 4, 5 of the side strand 1 are being united, the two stiff members 6, 7 bear upon the tread of the tire and in large measure support the weight of the remaining parts of the tire-chain structure. During this time most of such chain parts are held in suspension adjacent of the inner side face of the wheel, and in such suspended position the stiff members 6, 7 prevent the chain parts from becoming entangled behind the wheel. Again drawing attention to the stiff members 6, 7, I may remark that their curved shape, length and rigidity are such as will readily permit the entire device to be brought to the position shown in Fig. IV—the position in which the continuity of the inner side strand 1 may be completed without the attendant reaching behind the wheel 10.

When the continuity of the inner side strand 1 has been completed in the above-described manner, the attendant grasps the two cross-strands 3a, and slips the side strand 1 downward until it rests against the inner face of the tire. In such position the side strand 1 is in general disposed concentrically of the wheel 10 and against the inner side face of the tire. The curved shape of the two stiff members 6, 7 manifestly is perfectly adapted to such arrangement of the parts. While holding the two cross-strands 3a, the attendant works the side strand 2 toward the outer side face of the tire, and adjusts the cross-strands 3 across the tread of the tire, so that the chain structure as a whole is draped over the tire. It will be understood then that the method of my invention embraces the step or steps of completing the continuity of the side strand 1, and bringing the side strand 1 of completed continuity to the inner face of the tire and the cross-strands 3 across the tread of the tire. And it is characteristic of my invention that all this is accomplished without reaching behind the wheel.

During the draping of the chain structure over the tire, care is exercised to position the cross-strands 3a symmetrically, one on each side of the vertical diameter of the wheel 10. Accordingly, due to the particular position of the second break or parting (cf. 4a, 5a, Fig. V) in side strand 2, the cross-strands 3b, 3b will lie on opposite sides of such vertical diameter and on opposite sides of the area of contact between the tire and its supporting surface.

Next in the process the upper fastener 4, 5 in the outer side strand 2 is closed. If desired, however, the upper fastener 4, 5 in the outer side strand 2 may be closed or united while the chain is still in the position shown in Fig. IV, or before the chain structure as a whole has been draped over the tire. In either event, the draped tire chain is brought to the position shown in Fig. V. With the cross-strands 3b, 3b located on either side of the area of the tire tread resting upon the supporting surface, the side strand 2 is drawn to a position against the outer side of the tire, and then its continuity is completed, by uniting the fastener elements 4a, 5a. The tire chain is then completely installed, all steps in the installation of the chain having been readily performed by the attendant standing or crouching in a position adjacent the outer side of the tire. Any slack in the side strand 2 may be taken up by moving the upper fastener element 5 along one or more links, as indicated at 12 in Fig. VI. Indeed, I intend that the side strand 2 shall be slack when the fastener element 5 is first closed upon the end link 4 of strand 2, so that the fastener 4a, 5a may be readily united or closed.

In some cases the interval between the cross-strands 3b, 3b is greater than that between the other cross-strands, to the end that the chain structure may be easily bridged around the area of contact of the tire with the supporting surface. The device is removed from the tire by simply reversing the steps described above. When not in service, the chain structure is folded into a compact mass, with the stiff members 6, 7 extending beside one another. The stiff members facilitate the handling of the tire chain, and additionally tend to prevent the strands of the device from becoming entangled. It is further noteworthy that one chain structure may serve on any of the four wheels of a motor car, it being unnecessary to provide right and left chain structures.

The stiff members 6, 7 indicate at a glance which of the side strands is to go against the inner side face of the tire, thus avoiding confusion. The organization of the cross-strands 3a, 3a, in being substantially diametrically opposite to the cross-strands 3b, 3b, is important, and the importance of such organization may be based on the following considerations:

1. The organization permits the ends of the inner side strand 1 to be drawn over the top of the tire and into a position convenient for closing its fastener 4, 5.

2. The side strand 1 may conveniently be dropped into place and retain its place in proper circumferential position upon the inner surface of the tire.

3. The organization permits the entire device to be self-supporting upon the tire, preparatory to locking the fasteners in outer side strand 2.

4. The attendant may quickly and accurately determine the proper circumferential position of the device in relation to the tire, and likewise in relation to the contact area between the tire and its supporting surface, so that the closing of fastener 4a, 5a is facilitated. In brief the particular organization alluded to makes for the ready centering of the device upon the tire.

I claim as my invention:

1. A tire chain comprising flexible inner and outer side strands composed of chain links interconnected at intervals by cross-strands, the inner side strand including a separable fastener and embodying in its extent, adjacent the fastener, a stiff member of substantial length, and said outer flexible side strand including at substantial interval from one another in the extent of the strand two separable fasteners.

2. A tire chain comprising inner and outer side strands composed of chain links interconnected at intervals by cross-strands, the inner side strand including a separable fastener and embodying on each side of said fastener a stiff member, the extent of said inner side strand between said stiff members comprising a flexible linkage, and said outer side strand comprising a flexible linkage including at substantial interval from one another in the extent of said linkage two separable fasteners.

MARTIN A. SISK.